United States Patent [19]

Yamada et al.

[11] Patent Number: 5,168,452
[45] Date of Patent: Dec. 1, 1992

[54] ROUTE EXPLORATION METHOD OF NAVIGATION APPARATUS

[75] Inventors: Takashi Yamada; Mitsuhiro Nimura; Yasuhiro Toyama; Shoji Yokoyama, all of Anjo, Japan

[73] Assignees: Aisin Aw Co., Ltd.; Kabushiki Kaisha Shinsangyokaihatsu, both of Japan

[21] Appl. No.: 662,504

[22] Filed: Feb. 28, 1991

Related U.S. Application Data

[63] Continuation of Ser. No. 408,481, filed as PCT/JP88/01301, Dec. 23, 1988, abandoned.

[30] Foreign Application Priority Data

Dec. 28, 1987 [JP] Japan .................................. 62-333038
Aug. 22, 1988 [JP] Japan .................................. 63-207762

[51] Int. Cl.⁵ ............................................. G06F 15/50
[52] U.S. Cl. .................................. 364/444; 364/449; 340/995
[58] Field of Search ..................... 364/443, 444, 449; 340/990, 995

[56] References Cited

U.S. PATENT DOCUMENTS

| | | | |
|---|---|---|---|
| 4,570,227 | 2/1986 | Tachi et al. | 364/444 |
| 4,675,676 | 6/1987 | Takanabe et al. | 340/995 |
| 4,737,916 | 4/1988 | Ogawa et al. | 364/443 |
| 4,796,189 | 1/1989 | Nakayama et al. | 364/449 |
| 4,926,336 | 5/1990 | Yamada | 364/444 |
| 4,984,168 | 1/1991 | Neukrichner et al. | 364/449 |

FOREIGN PATENT DOCUMENTS 216016 12/1984 Japan .
134900 6/1986 Japan .

OTHER PUBLICATIONS

"Car Guide-On-Board Computer for Automobiles", National Computer Conference, 1984, pp. 697-706, author unknown.

Primary Examiner—Thomas G. Black
Attorney, Agent, or Firm—Lorusso & Loud

[57] ABSTRACT

In a navigation apparatus for setting a route from a designated departure point to a destination and providing guidance along the route, there are provided, as map data used in route exploration, node data [FIG. 15(b)] comprising position information and information relating to the attributes thereof, intersection data [FIGS. 2-5(b), FIG. 15(b)] comprising information relating to intersections, and road data [FIGS. 2-5(a), FIG. 15(c)] comprising information related to roads. Information such as roads between intersections and intersections which are the starting and end points of roads are obtained from the intersection data and road data, and an optimum route is retrieved by comparing routes. The map data is put into the form of a layered structure, as shown in FIG. 1, a branch road network is developed in an upper-layer (2) connected to a trunk road network with respect to a higher-order layer (1) of the trunk road network, block division is performed, and exploration from a lower-order layer to intersections connected to a road network of the higher-order layer is successively repeated. The foregoing makes it possible to perform processing upon limiting the range of exploration, and to raise the speed of exploration processing. In addition, the work area needed for exploration can be reduced and storage data can be conserved.

4 Claims, 21 Drawing Sheets

FIG. 2(a)

ROAD

| ROAD NO. | STARTING POINT | END POINT | SAME STARTING POINT | SAME END POINT | NOT REQUIRING GUIDANCE | RELATIVE LENGTH | LAYER |
|---|---|---|---|---|---|---|---|
| ① | I | II | ③ | ⑭ | ⑬ | 4 | 2 |
| ② | II | I | ⑬ | ④ | 0 | 4 | 2 |
| ③ | I | III | ① | ⑥ | 0 | 5 | 2 |
| ④ | III | I | ⑤ | ② | 0 | 5 | 2 |
| ⑤ | III | VI | ⑦ | ⑤ | 0 | 1 | 2 |
| ⑥ | VI | III | ⑥ | ⑧ | 0 | 1 | 2 |
| ⑦ | III | IV | ④ | ⑫ | ⑪ | 3 | 1 |
| ⑧ | IV | III | ⑨ | ③ | 0 | 3 | 1 |
| ⑨ | IV | VII | ⑪ | ⑨ | 0 | 4 | 2 |
| ⑩ | VII | IV | ⑩ | ⑫ | ⑭ | 4 | 2 |
| ⑪ | IV | V | ⑭ | ⑪ | 0 | 1 | 1 |
| ⑫ | V | IV | ⑫ | ⑬ | ⑧ | 1 | 1 |
| ⑬ | II | IV | ② | ⑦ | 0 | 3 | 2 |
| ⑭ | IV | II | ⑧ | ① | ② | 3 | 2 |

FIG. 2(b)

| INTERSECTION NO. | EAST LONGITUDE | NORTH LATITUDE | NO. OF EXITING ROAD | NO. OF ENTERING ROAD | INTERSECTION NO. OF UPPER LAYER | INTERSECTION NO. OF LOWER LAYER | INTERSECTION NO. OF BLOCK ALONGSIDE |
|---|---|---|---|---|---|---|---|
| I | | | ① | ② | 0 | 0 | 0 |
| II | | | ② | ① | 0 | 0 | 0 |
| III | | | ④ | ③ | 1-1-1 | 0 | 0 |
| IV | | | ⑧ | ⑦ | 1-1-2 | 0 | 0 |
| V | | | ⑫ | ⑪ | 0 | 0 | 2-2-2 |
| VI | | | ⑥ | ⑤ | 0 | 0 | 2-4-5 |
| VII | | | ⑩ | ⑨ | 0 | 0 | 2-4-4 |

| ROAD NO. | STARTING POINT | END POINT | SAME STARTING POINT | SAME END POINT | NOT REQUIRING GUIDANCE | RELATIVE LENGTH | LAYER |
|---|---|---|---|---|---|---|---|
| ① | I | II | ③ | ② | ⑦ | 5 | 2 |
| ② | II | I | ⑦ | ④ | 0 | 5 | 2 |
| ③ | I | V | ⑤ | ③ | 0 | 5 | 2 |
| ④ | V | I | ④ | ⑥ | 0 | 5 | 2 |
| ⑤ | I | III | ① | ⑤ | 0 | 3 | 1 |
| ⑥ | III | I | ⑥ | ② | 0 | 3 | 1 |
| ⑦ | II | IV | ② | ⑦ | 0 | 3 | 2 |
| ⑧ | IV | II | ⑧ | ① | ② | 3 | 2 |

ROAD

| INTERSEC-TION NO. | EAST LONGI-TUDE | NORTH LATI-TUDE | NO. OF EXITING ROAD | NO. OF ENTERING ROAD | INTERSECTION NO. OF UPPER LAYER | INTERSECTION NO. OF LOWER LAYER | INTERSECTION NO. OF BLOCK ALONGSIDE |
|---|---|---|---|---|---|---|---|
| I | | | ① | ② | 1-1-3 | 0 | 0 |
| II | | | ② | ① | 0 | 0 | 0 |
| III | | | ⑥ | ⑤ | 0 | 0 | 2-5-2 |
| IV | | | ⑧ | ⑦ | 0 | 0 | 2-1-7 |
| V | | | ④ | ③ | 0 | 0 | 2-1-6 |

FIG. 4(a)

ROAD

| ROAD NO. | STARTING POINT | END POINT | SAME STARTING POINT | SAME END POINT | NOT REQUIRING GUIDANCE | RELATIVE LENGTH | LAYER |
|---|---|---|---|---|---|---|---|
| ① | I | II | ⑦ | ④ | ③ | 3 | 2 |
| ② | II | I | ③ | ⑧ | ⑦ | 3 | 2 |
| ③ | II | III | ② | ⑥ | ⑤ | 2 | 2 |
| ④ | III | II | ⑤ | ① | ② | 2 | 2 |
| ⑤ | III | IV | ④ | ⑤ | 0 | 1 | 1 |
| ⑥ | IV | III | ⑥ | ③ | ④ | 1 | 1 |
| ⑦ | I | V | ① | ⑦ | 0 | 1 | 1 |
| ⑧ | V | I | ⑧ | ② | ① | 1 | 1 |

FIG. 4 (b)

| INTERSEC-TION NO. | EAST LONGI-TUDE | NORTH LATI-TUDE | NO. OF EXITING ROAD | NO. OF ENTERING ROAD | INTERSECTION NO. OF UPPER LAYER | INTERSECTION NO. OF LOW LAYER | INTERSECTION NO. OF BLOCK ALONGSIDE |
|---|---|---|---|---|---|---|---|
| I | | | ① | ② | 1-1-7 | 0 | 0 |
| II | | | ② | ① | 0 | 0 | 0 |
| III | | | ④ | ③ | 1-1-8 | 0 | 0 |
| IV | | | ⑥ | ⑤ | 0 | 0 | 2-3-3 |
| V | | | ⑧ | ⑦ | 0 | 0 | 2-5-4 |

FIG. 5(a)

ROAD

| ROAD NO. | START-ING POINT | END POINT | SAME STARTING POINT | SAME END POINT | NOT REQUIRING GUIDANCE | RELATIVE LENGTH | LAYER |
|---|---|---|---|---|---|---|---|
| ① | I | II | ① | ④ | ③ | 3 | 1 |
| ② | II | I | ③ | ② | 0 | 3 | 1 |
| ③ | II | V | ② | ⑦ | ⑨ | 5 | 1 |
| ④ | V | II | ⑧ | ① | ② | 5 | 1 |
| ⑤ | III | IV | ⑤ | ⑧ | ⑭ | 5 | 1 |
| ⑥ | IV | III | ⑦ | ⑥ | 0 | 5 | 1 |
| ⑦ | IV | V | ⑭ | ⑩ | 0 | 4 | 1 |
| ⑧ | V | IV | ⑨ | ⑬ | 0 | 4 | 1 |
| ⑨ | V | VI | ④ | ⑫ | ⑪ | 5 | 1 |
| ⑩ | VI | V | ⑪ | ③ | ④ | 5 | 1 |
| ⑪ | VI | VIII | ⑩ | ⑪ | 0 | 4 | 1 |
| ⑫ | VIII | VI | ⑫ | ⑨ | ⑩ | 4 | 1 |
| ⑬ | VII | IV | ⑬ | ⑤ | ⑥ | 6 | 1 |
| ⑭ | IV | VII | ⑥ | ⑭ | 0 | 6 | 1 |

FIG. 5 (b)

| INTERSEC-TION NO. | EAST LONGI-TUDE | NORTH LATI-TUDE | NO. OF EXITING ROAD | NO. OF ENTERING ROAD | INTERSECT NO. OF UPPER LAYER | INTERSECTION NO. OF LOWER LAYER | INTERSECTION NO. OF BLOCK ALONGSIDE |
|---|---|---|---|---|---|---|---|
| I | | | ① | ② | 0 | 2-1-3 | 0 |
| II | | | ② | ① | 0 | 2-1-4 | 0 |
| III | | | ⑤ | ⑥ | 0 | 2-4-1 | 0 |
| IV | | | ⑥ | ⑤ | 0 | 2-5-1 | 0 |
| V | | | ④ | ③ | 0 | 2-2-1 | 0 |
| VI | | | ⑩ | ⑨ | 0 | 2-3-1 | 0 |
| VII | | | ⑬ | ⑭ | 0 | 2-6-1 | 0 |
| VIII | | | ⑫ | ⑪ | | 2-6-3 | |

| ADDRESS | EAST LONGITUDE | NORTH LATITUDE | ATTRIBUTE |
|---|---|---|---|
| | 135.5 | 35.1 | 0 1 |
| | 135.6 | 35.2 | 0 1 |
| 100 | | | |
| 200 | | | |

FIG. 15(b)

| INTERSECTION NO. | INTERSECTION NAME | SMALLEST NO. ROAD HAVING THIS INTERSECTION AS STARTING POINT | SMALLEST NO. ROAD HAVING THIS INTERSECTION AS END POINT | TRAFFIC SIGNAL PRESENT? |
|---|---|---|---|---|
| I | KANDA | 1 | 2 | YES |
| II | YUSHIMA | 2 | 1 | YES |
| III | — | 4 | 3 | NO |
| IV | — | 6 | 5 | |

FIG. 15(c)

| ROAD NO. | STARTING POINT | END POINT | NO. OF NEXT ROAD HAVING SAME STARTING POINT | ROAD HAVING SAME END POINT | ROAD WIDTH | PROHIBITION ① | PROHIBITION ② | GUIDANCE UNNECESSARY | PHOTOGRAPH NO. | NUMBER OF NODES | LEADING ADDRESS OF NODE SERIES DATA | LENGTH |
|---|---|---|---|---|---|---|---|---|---|---|---|---|
| 1 | I | II | 7 | 4 | 1 | — | — | 3 | 1 | 15 | 100 | |
| 2 | II | I | 3 | 8 | 1 | — | — | 7 | 2 | 13 | 200 | |
| 3 | II | II | 2 | 3 | 2 | — | — | 5 | 3 | 9 | 300 | |
| 4 | III | II | 5 | 6 | 2 | — | — | 2 | 4 | 20 | 500 | |
| 5 | III | IV | 4 | 7 | 2 | 6 | — | 8 | 5 | 25 | 600 | |
| 6 | IV | II | 8 | 1 | 1 | 3 | 2 | — | 6 | 30 | 700 | |
| 7 | I | IV | 1 | 5 | 0 | — | — | — | 7 | 9 | 800 | |
| 8 | IV | I | 6 | 2 | 0 | — | — | 1 | 8 | 3 | 900 | |

FIG.17(a)

| INTERSECTION NAME |
|---|
| INTERSECTION NO. |
| PHOTO NO. |
| ANGLE |
| DISTANCE |
| INTERSECTION NAME |

FIG.17(b)

| EAST LONGITUDE |
|---|
| NORTH LATITUDE |
| INTERSECTION NO. |
| ATTRIBUTE |
| ANGLE |
| DISTANCE |
| EAST LONGITUDE |

ROUTE EXPLORATION METHOD OF NAVIGATION APPARATUS

This application is a continuation of application Ser. No. 07/408,481, filed as PCT/JP88/01301, Dec. 23, 1988, now abandoned.

DESCRIPTION

1. TECHNICAL FIELD

This invention relates to a route navigation apparatus which searches for the shortest route from a point of departure to a destination. More particularly, the invention relates to a route exploration method of a navigation apparatus which searches for a route by putting map data into a heirarchical structure

2. Background Art

A navigation apparatus provides route guidance for travel to a destination to a driver who is unfamiliar with the local geography. Recent years have seen extensive development of such navigation apparatus The conventional navigation apparatus is adapted to set a route from a point of departure to a desired destination by being provided with an input of point of departure and destination prior to travel, and to perform navigation in accordance with the route set. In a case where a route is designated, navigation is such that a map is displayed on the screen of a CRT and the route is superimposed on the map. In some apparatus, distance to an intersection at which a turn is to be made next is displayed numerically, in the form of a graph or as a characteristic photograph as information relating to the intersection at which the next turn is to be made in accordance with the preset route. A voice-track output is also used in some of these apparatus. A road network usually possesses a plurality of routes from a point of departure to a destination. Accordingly, attempts have been made to employ a route exploration method in a navigation apparatus in which, when the apparatus is provided with inputs of departure point and destination, a route (referred to as the "shortest route") representing the shortest path between these two points in terms of time or distance is retrieved. In one example of a reported method, in order to express left and right turns, movement straight ahead and a U-turn in case of an intersection where four roads cross, the intersection is represented by eight nodes and 16 directional links, and branch roads interconnecting intersections are represented by two directional links. In another method, the shortest route once retrieved is compared with courses along which travel is prohibited, and shortest routes which include these prohibited routes are excluded, whereby there is retrieved a shortest route which does not include a prohibited route. (For example, see Japanese Patent Application Laid-Open No. 62-91811.)

However, a problem encountered in the former method is that since left-right turn information at an intersection is expressed entirely in terms of directional links, there is a large quantity of data and, hence, a large storage capacity is required. In addition, the conventional data structure is such that when it is attempted to retrieve a route which is the shortest in terms of time by detecting a left or right turn and applying weighting depending upon a left or right turn, the computations for judging left and right turns is complicated and time-consuming. In particular, when four intersecting roads are expressed by eight nodes and 16 directional links, distance or time data applied as weighting to the 16 directional links must be provided. As a consequence, the amount of data is increased.

Furthermore, when the distance from the departure point to the destination is long or the road network has a high density, route exploration is such that there are a correspondingly large number of intersections which may be the object of retrieval. Consequently, there is an increase in computation time required for route exploration and an increase in storage capacity required of the memory used when performing exploration processing.

An object of the present invention is to reduce the quantity of stored data and make possible high-speed route exploration inclusive of decisions regarding data related to prohibited left and right turns. Another object of the invention is to shorten the time needed for route exploration computations.

DISCLOSURE OF THE INVENTION

In order to attain the foregoing objects, the present invention provides a route exploration method in a navigation apparatus for setting a route from a designated departure point to a destination and providing guidance along the route, characterized by providing, as map data used in route exploration, node data comprising position information and informatation relating to the attributes thereof, intersection data comprising information relating to intersections, and road data comprising information related to roads, and retrieving an optimum route from the intersection data and road data. The invention is further characterized by putting map data into a layered structure, developing a branch road network connected to a trunk road network with respect to a higher-order layer of the trunk road network and performing block division, and successively repeating exploration from a lower-order layer to intersections connected to a road network of the higher-order layer, and retrieving a route from the departure point to the destination. Further, the invention is characterized by having, as the map data, connection information relating to roads between intersections for every block of each layer, and connecting-intersection information for connection to the higher-order layer, increasing the number of divided blocks of the lower-order layer in conformity with the amount of information, and rising to a higher-order layer, while repeating exploration from the lower-order layer, until a departure-point block and a destination block become the same block or neighboring blocks. The invention is further characterized by setting, as the map data, left-right turn prohibition information and route conversion information, such as information relating to guidance not required and degree of difficulty to pass through a road, excluding from retrieved courses, at the time of route retrieval, roads for which left-right turn prohibition information has been set, and retrieving an optimum route upon attaching route conversion information.

By virtue of this arrangement, when route exploration is performed in blocks which include departure point and destination in the lower-order layer and there is an intersection number in the higher-order layer, route exploration is carried out in the block of this layer. If there is no intersection number in the higher-order layer, route exploration from this intersection to an intersection having an intersection number of the higher-order layer is performed and a transition is made to a block of a still higher order layer. When the block of the departure point and the block of the destination become the same block or mutually adjacent blocks, route exploration from the departure point to the destination is terminated between the blocks.

Accordingly, by setting block units in each layer in such a manner that the amount of data is the same, it will suffice to perform route exploration repeatedly in the same memory capacity at all times even if there is a large amount of information and the road network is complicated. As a result, even a small storage capacity necessary for route exploration will suffice, route exploration can be carried out efficiently and computation time needed for route exploration can be shortened.

When the road data is provided with left-right turn prohibition information or route conversion information, route exploration means excludes roads for which the left-right prohibition information has been set from retrieved courses when routes are being retrieved, and an optimum route can be retrieved efficiently using the route conversion information. As a result, wasteful exploration processing is eliminated and processing can be speeded up.

BRIEF DESCRIPTION OF THE DRAWINGS

FIGS. 2(a) and 2(b are views illustrating an example of the data structure of a block 1 in a layer 2 of FIG. 1;

FIGS. 3(a) and 2(b) are views illustrating an example of the data structure of, a block 4 in a layer 2 of FIG. 1;

FIGS. 4(a) and 4(b) are views illustrating an example of the data structure of a block 6 in a layer 2 of FIG. 1;

FIGS. 5(a) and 5(b) are views illustrating an example of the data structure of a block 1 in a layer 1 of FIG. 1;

FIGS. 15(a)-15(d) are views showing examples of road network and intersection data, road data and node series data;

FIGS. 17(a) and 17(b) are views showing an example of the data structure of an intersection series and node series generated by route exploration according to the invention.

BEST MODE FOR CARRYING OUT THE INVENTION

Figure 1:
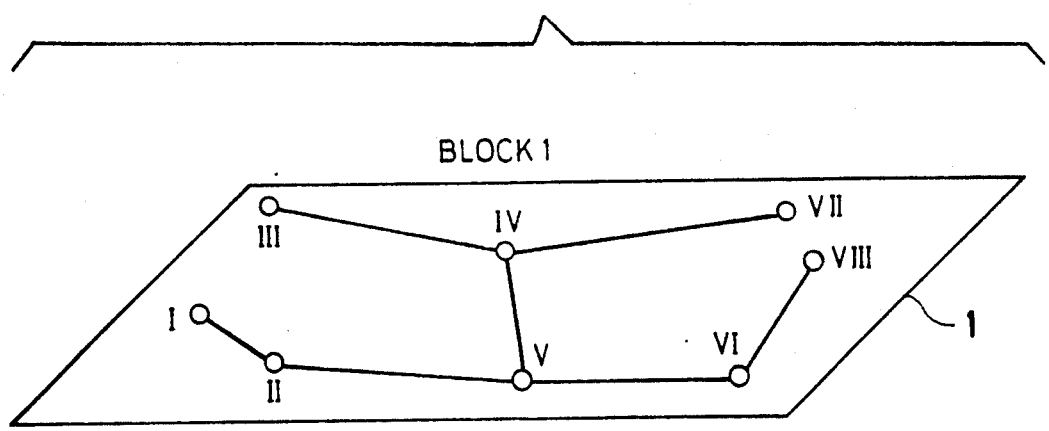
FIG. 1 is a view for describing an embodiment of a route exploration method according to the present invention.
Figure 1:
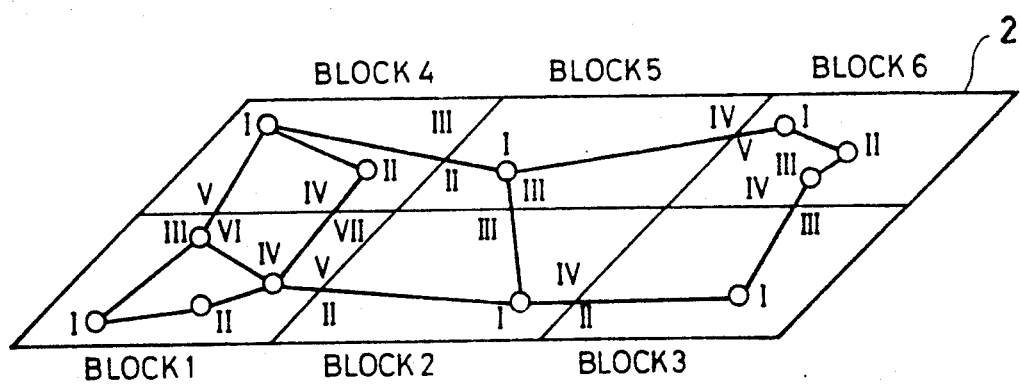

In FIG. 1, a layer 1 is a map of a principal trunk road network having intersection numbers I, II, III, and so on. The layer 1 is composed of a single block 1. A layer 2 is a map which also includes a road network of branch lines connected to the principal trunk road network. This layer is composed of six blocks 1-6. Intersections are set in dummy fashion on connecting roads between blocks, as in the manner of intersection numbers V and II between blocks 1 and 2 of layer 2, in such a manner that processing units can be constituted by blocks. The number of blocks is set in such a manner that the amount of information in each is approximately the same. Accordingly, block 1 in layer 1 and blocks 1-6 in layer 2 are such that each possesses the same amount of information as road network data.

As described above, the route exploration method of the present invention employs map data of a layered structure comprising layers 1, 2, . . . each divided into blocks as the data expand from trunk roads to branch roads in the direction of descending heirarchy. These data are used to search for routes from a point of departure to a destination. Accordingly, in a case where there are branch roads lower in the heirarchy than the road network of layer 2, a layer 3 is set and this layer possesses a greater number of blocks in conformity with the amount of information. Similarly, in a case where a peripheral road network is also a subject of exploration, layer 1 need not be composed of only the one block 1 but may be constituted by block 1 and the blocks of the road network peripheral thereto. In such case, a layer higher in the heirarchy than layer 1 will be set.

An example of a route exploration method using the road data of FIG. 1 will now be described.

By way of example, assume that a point of departure and a destination are an intersection number 1 in block 1 of layer 2 and an intersection number III in block 6 of layer 2, respectively.

First, with regard to the departure point at intersection number I of block 1, the intersection number of this departure point is not in layer 1 of the higher-order layer. Accordingly, the intersection numbers that are in layer 1 of the higher-order layer are found, routes to these intersection numbers III, IV (intersection numbers I, II in layer 1) are retrieved and these are raised to the higher-order layer.

On the other hand, the intersection number III in block 6 is intersection number VIII in layer 1 of the higher-order layer. Therefore, this is raised to the higher-order layer as is. In the higher-order layer 1, route exploration from intersection number I or II to the intersection number VIII is performed using also the information retrieved in the lower-order layer 2.

As will be evident from the foregoing description, there are three categories that can be classified depending upon the blocks in which the departure point and destination reside, namely (1) a case in which the blocks are the same block, (2) a case in which the blocks are mutually adjacent blocks, and (3) a case in which the blocks are remote from each other. Route exploration in the invention is such that exploration is performed as follows depending upon each case:

First, in case (1) where the departure point and destination are in the same block, route exploration is performed in that block. In case (2) where the departure point and destination are in mutually adjacent blocks, route exploration is performed by detecting an intersection (connecting intersection) connecting the departure-point block and destination block, and dividing course exploration into two parts, namely from the departure point to the connecting intersection and from the destination to the connecting intersection. However, in case (3) where the blocks containing the departure point and destination are remote from each other, exploration is performed in the departure-point block from the departure point to the intersection connected to the higher-order layer, as in the example described above, and exploration is similarly performed in the destination block from the destination to to the intersection connected to the higher-order layer. Similar route exploration is performed upon being raised to the higher-order layer until the condition (1) or (2) is satisfied.

Next, an example of the specific structure of road data well suited for use in the foregoing route exploration method will be illustrated.

As shown in FIGS. 2 through 5, the data in each block unit comprise road data [(a) of these Figures] and intersection data [(b) of these Figures]. For example, as shown in FIG. 2, the road data include, in correspondence with each road number of a block, such information as starting-point intersection number, end-point intersection number, road number having the same starting point, road number having the same end point, a road not requiring guidance, relative length of the road, layer, etc. The unit of a road number usually comprises a plurality of nodes. Though not shown, node data are data relating to one geographical point on a road. If the term "arc" is used to describe what connects two nodes, a road can be expressed by interconnecting a plurality of nodes of a node series by arcs. The intersection data include, in correspondence with the each intersection number in a block, such information as east longitude, north latitude, exiting road number, entering road number, intersection number on a higher layer, intersection number on a lower layer, intersection number of a block alongside (connecting intersection number), etc. Among the foregoing, the road numbers having the same starting points (end points) and the exiting (entering) road numbers constitute information relating to connecting roads at each intersection. Since a plurality of raod numbers usually exist, the smallest road number among them is registered. When this is done, retrieval of the connecting roads of an intersection can be performed with ease, as will be set forth later. Roads not requiring guidance and the relative lengths of roads constitute information which is required when calculating actual time needed for travel. For example, even if roads have the same width or length, actual travel time can be calculated quicker for roads not requiring guidance than for roads that do require guidance. Even if roads have the same length, relative length can be greater if the travelling conditions are poor or if traffic tie-ups are likely. Layer indicates the rank of a road. In other words,, this is information indicating which layer of what rank possesses a road. The intersection number of an upper (lower) layer, e.g., 1-1-2, indicates layer 1 —block 1 —intersection number in this layer block. The same is true for an intersection number of a block alongside.

The route retrieval method according to the invention will now be described in accordance with the flow of processing.

Figures 6A, 6B:
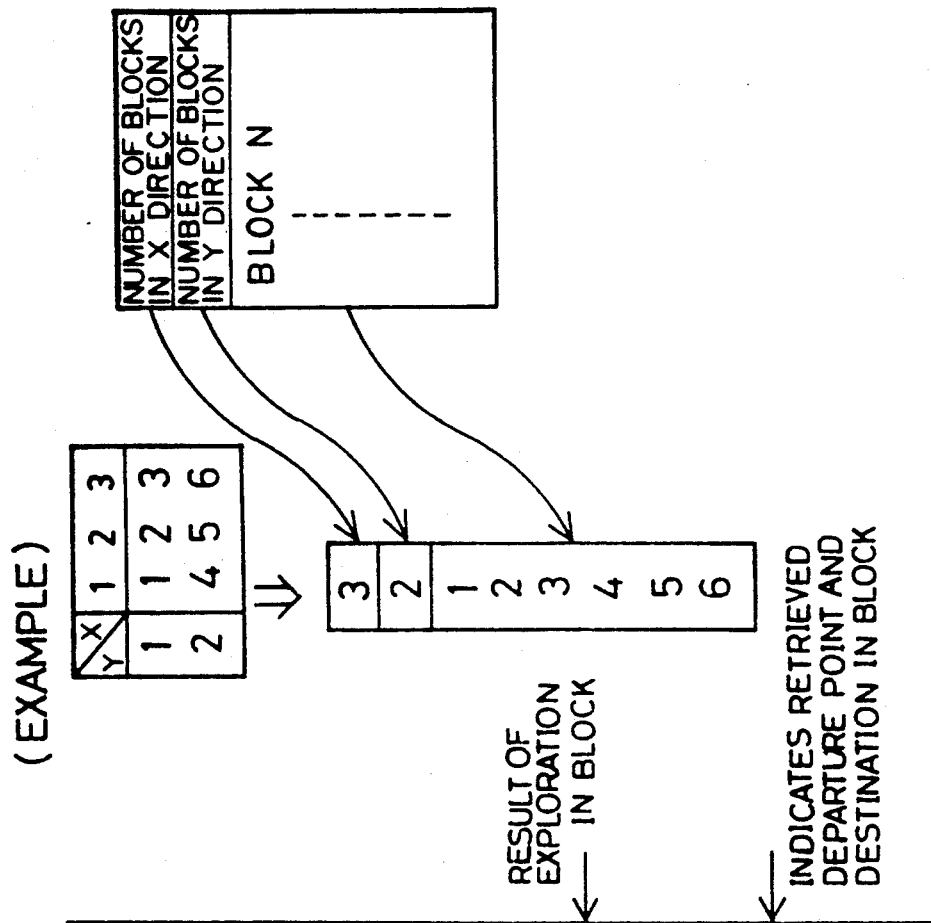
FIGS. 6(a) and 6(b) are views illustrating the structure of a work file and index file.

A work file makes use of intersection data and road data in a block read in when performing exploration in block units. As shown in FIG. 6(a), the information stored in a work file includes the number of intersections, starting points, end points, the number of roads, the number of roads entering an intersection obtained as a result of exploration processing in a block, and flags indicating departure point and destination in a block An index file is for processing information in a block. As shown in FIG. 6(b), an index file includes the number of blocks and block numbers.

Figure 7:
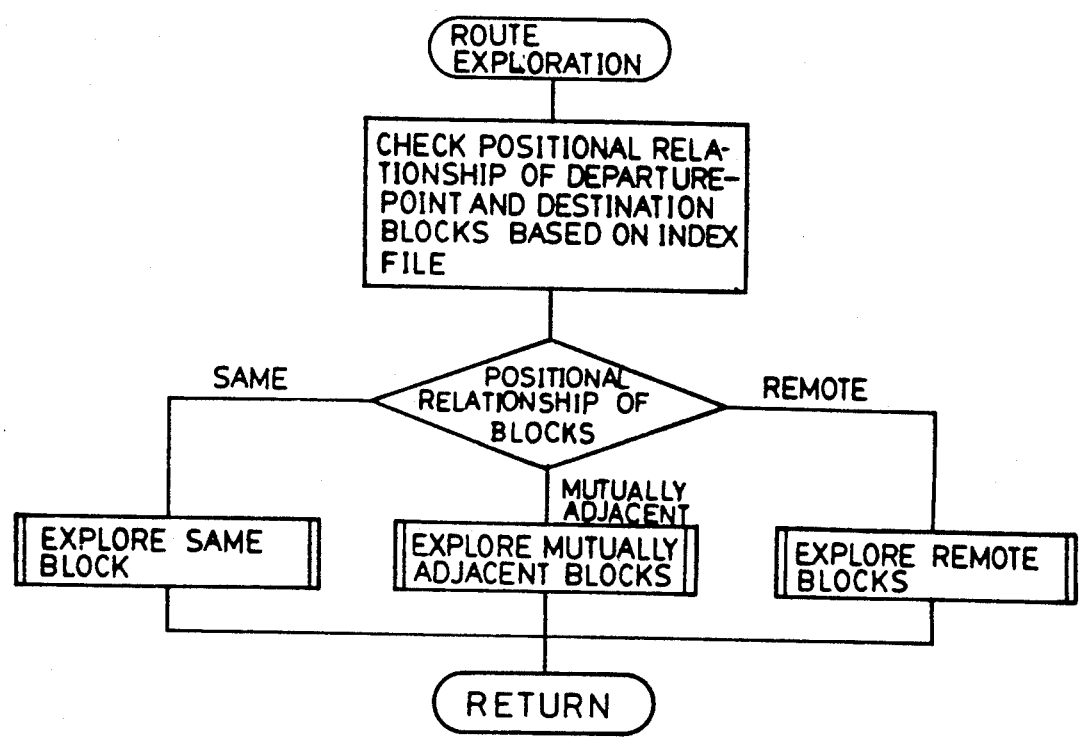
FIG. 7 is a view for describing the flow of overall processing in route exploration.
Figure 8:
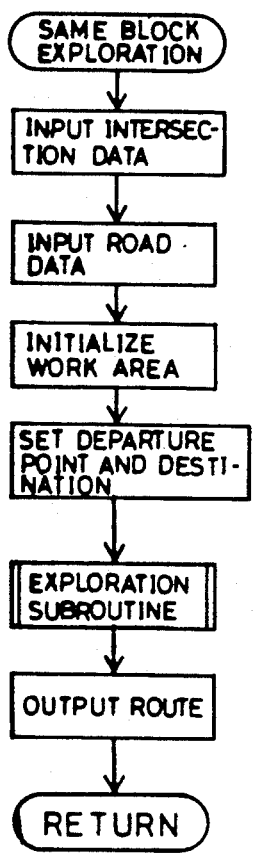
FIG. 8 is a view illustrating an example of an identical block exploration routine.

In course exploration, as shown in FIG. 7, the positional relationship of departure-point and destination blocks is investigated based on the index file. Depending upon the positional relationship, processing branches to processing routines for identical-block exploration, adjacent-block exploration and remote-block exploration, described below In identical-block exploration, as shown in FIG. 8, intersection data and road data are entered, the work area is initialized and departure point and destination are set. Thereafter, processing branches to the route exploration subroutine, where routes retrieved and generated are outputted.

Figure 9:
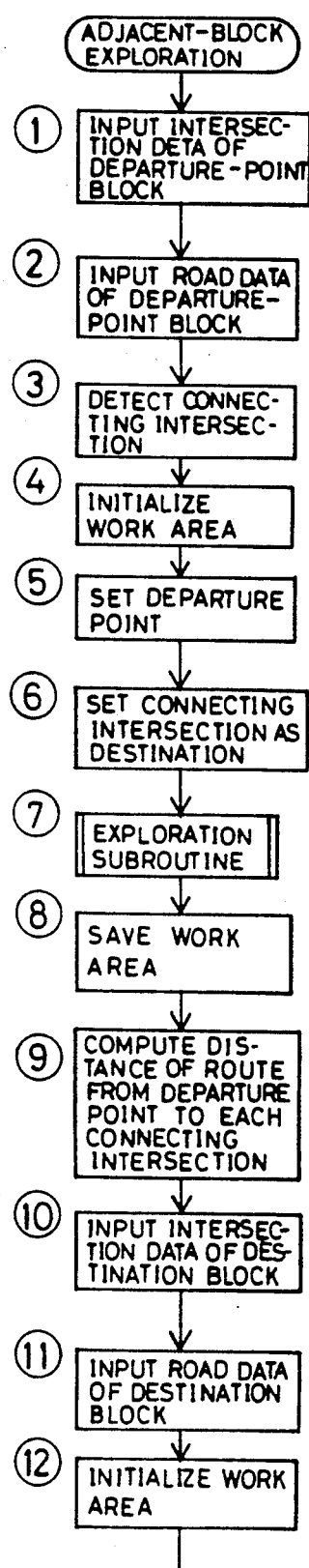
FIG. 9 is a view illustrating an example of a neighboring block. exploration routine.
Figure 9:
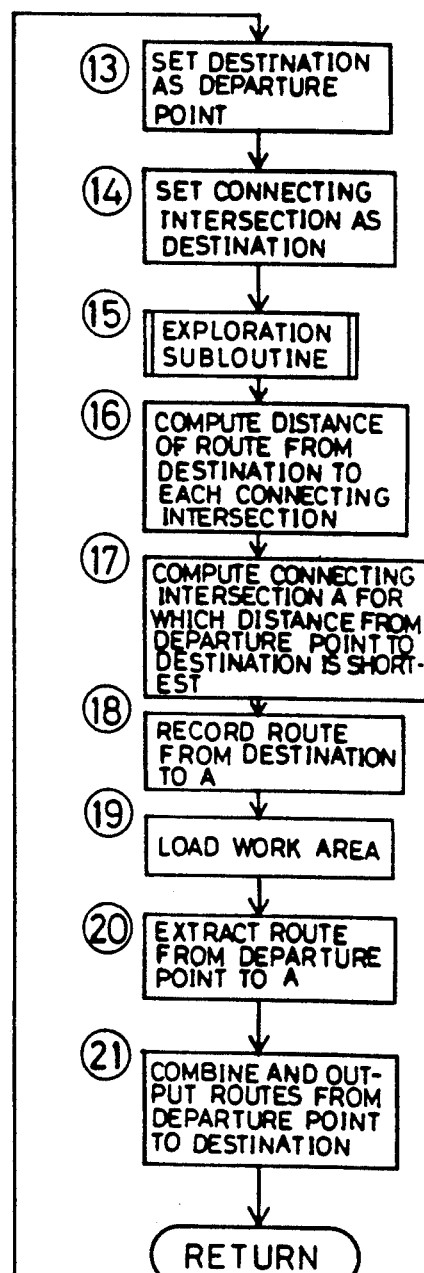
Figure 10:
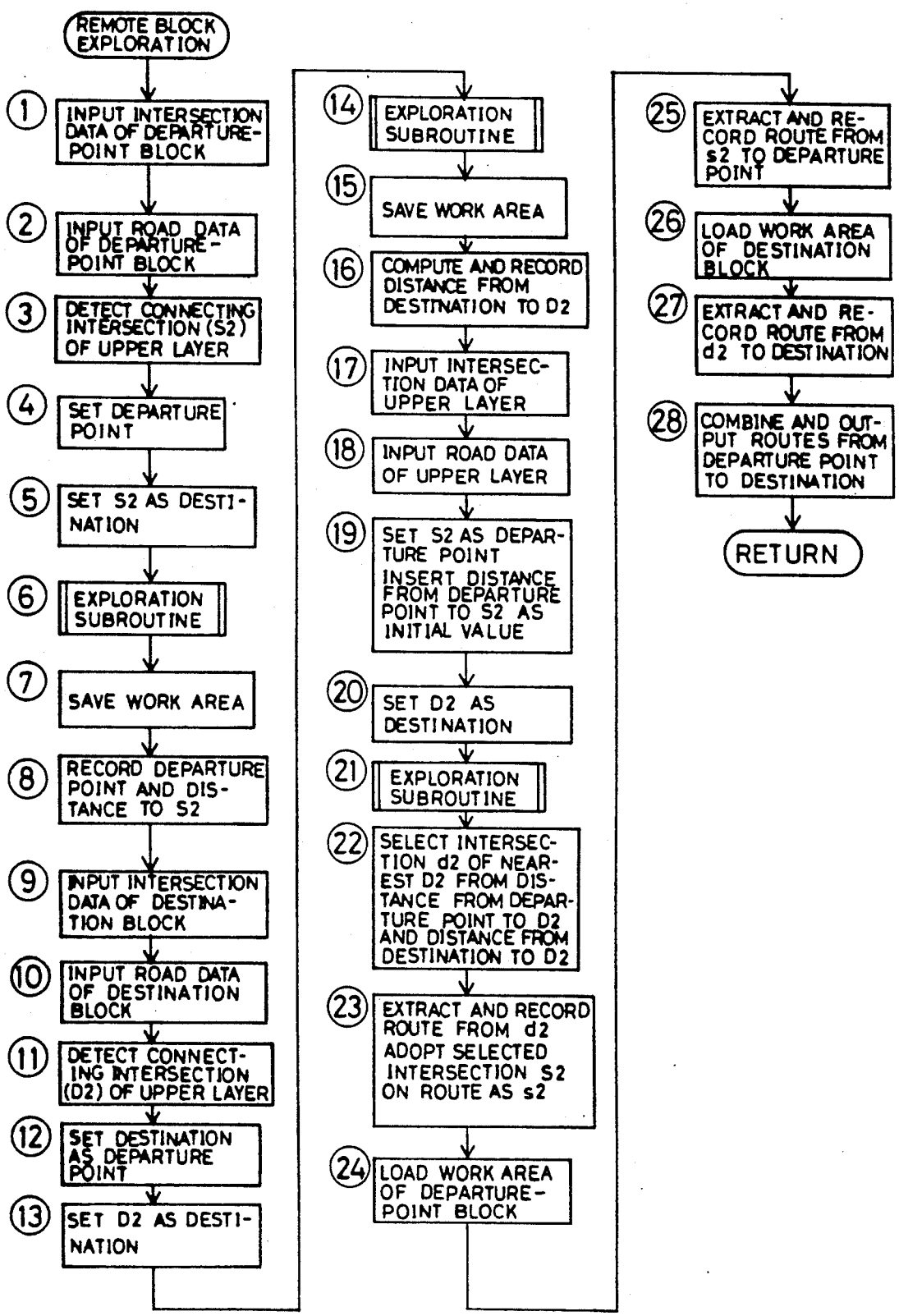
FIG. 10 is a view illustrating an example of a remote block exploration routine.

In adjacent-block exploration, where intersection number is expressed in the form of C (layer—block-—intersection number) and road number in the form of R (layer—block—road number), and where departure point is represented by C (2-1-1) and destination by C (2-4-4), processing is performed as follows in accordance with the steps shown in FIG. 9:

①, ② The data of layer 2, block 1 containing the departure point are read in.

③ Connecting intersections S are stored in a memory, as set forth below:

| CONNECTING INTERSECTION S | |
|---|---|
| C(2-1-6) | C(2-4-5) |
| C(2-1-7) | C(2-4-4) |

④ All intersectons in a block in the work area are set and initialized as follows:

ROADS ARRIVING AT ← 0
INTERSECTION
FLAG ← UNEXPLORED
DISTANCE ← 7FFFFFFFH

⑤ The flag of the departure-point intersection C (2-1-1) in the work area is set to "provisional" and distance is set to "0".

⑥ Connecting intersections (2-1-6), C(2-1-7) are set as destinations.

⑦0 Exploration is performed from the departure-point intersection C (2-1-1) to the connecting intersections (2-1-6), C (2-1-7), which are provisional destinations.

⑧, ⑨ The work area is saved. Distances to the connecting intersections at this time are stored in a memory as follows:

| CONNECTING INTERSECTION S | | DISTANCE |
|---|---|---|
| C(2-1-6) | C(2-4-5) | 6 |
| C(2-1-7) | C(2-4-4) | 11 |

(10) - (15) Exploration similar to that of ④-⑦ is performed, with C (2-4-1) serving as the departure point and the connecting intersections C (2-4-5), C (2-4-4) serving as the destinations.

16 – 17 The connecting intersections for the shortest course are selected. For example, if it is assumed that distance from the departure point and distance from the destination are as follows:

| CONNECTING INTERSECTIONS | | FROM DEP. PT. | FROM DEST. |
| --- | --- | --- | --- |
| C(2-1-6) | C(2-4-5) | 6 | 5 |
| C(2-1-7) | C(2-4-4) | 11 | 8 | then the connecting intersections will be C (2-1-6), C (2-4-5) for which the route distances are the shortest, this being based on (6+5)<(11+8)

18 A route C (2-4-1) - C (2-4-5) of the destination block is generated.

19 – 20 The work area is loaded and a route C (2-1-1) - C (2-1-3) - C (2-1-6) of the departure-point block is created.

21 The aforementioned routes are combined and C (2-1-1) - C (2-1-3) - C (2-1-6) - C (2-4-1) - C (2-4-5) is outputted.

Remote block exploration will now be described. Here it will be assumed that the departure point is C (2-1-1) and that the destination is C (2-6-2).

①-② Data of layer 2, block 1, which contains the departure point, are read in.

③ Connecting intersections S2 to the higherorder layer are detected.

| CONNECTING INTERSECTION S2 | |
| --- | --- |
| C(2-1-3) | C(1-1-1) |
| C(2-1-4) | C(1-1-2) |

④-⑦ C (2-1-1) is retrieved as the departure point and C (2-1-3), C (2-1-4) are retrieved as destinations, and the work area is saved.

⑧ Distances from the departure point to the connecting intersections S2 are stored in a memory.

| CONNECTING INTERSECTION S2 | | DISTANCES |
| --- | --- | --- |
| C(2-1-3) | C(1-1-1) | 5 |
| C(2-1-4) | C(1-1-2) | 7 |

⑨- 10 Data of layer 2, block 6, which contains the destination, are read in.

11 Connecting intersections D2 to the higherorder layer are detected.

| CONNECTING INTERSECTION D2 | |
| --- | --- |
| C(2-6-1) | C(1-1-7) |
| C(2-6-3) | C(1-1-8) |

12 – 15 C (2-6-2) is retrieved as the departure point and C (2-6-1), C (2-6-3) are retrieved as destinations, and the work area is saved.

16 Distances from the departure point to the connecting intersections S2 are stored in a memory.

| CONNECTING INTERSECTION S2 | | DISTANCE |
| --- | --- | --- |
| C(2-6-1) | C(1-1-7) | 3 |

-continued

| CONNECTING INTERSECTION S2 | | DISTANCE |
| --- | --- | --- |
| C(2-6-3) | C(1-1-8) | 2 |

17 – 18 Data of higher-order layer 1, block 1 are entered.

19 Connecting intersections S2 [C (1-1-1), C (1-1-2)] are set as departure points. Also, distances from the departure points to the connecting intersections are set as initial values of distance.

20 Connecting intersections D2 [C (1-1-7), C (1-1-8)] are set as destinations.

21 Connecting intersections D2 [C (1-1-7), C (1-1-8)] are retrieved from connecting intersections S2 [C (1-1-1), C (1-1-2)].

22 Distances from the departure points to the connecting intersections D2 are compared with distances from the destinations to connecting intersections D2. For example, if it is assumed that distances from the departure points and distances from the destinations are as follows:

| CONNECTING INTERSECTIONS | | FROM DEP. PT. | FROM DEST. |
| --- | --- | --- | --- |
| C(2-6-1) | C(1-1-7) | 22 | 3 |
| C(2-6-3) | C(1-1-8) | 21 | 2 | then the connecting intersections will be C (2-6-3), C (1-1-8) for which the route distances are the shortest, this being based on (22+3)<(21+2)

23 Route C (1-1-8) - C (1-1-6) - C (1-1-5) - C (1-1-2) of layer 1 is extracted.

24 – 25 The work area of the departure-point block is loaded and route C (2-1-4) - C (2-1-2) - C (2-1-1) of the departure-point block is extracted.

26 – 27 The work area of the destination block is loaded and route C (2-6-3) - C (2-6-2) of the destination block is extracted.

28 The aforementioned routes are combined and C (2-1-1) - C (2-1-2) - C (2-1-4) - C (1-1-5) - C (1-1-6) - C (2-6-3) - C (2-6-2) is outputted.

The route exploration subroutine will now be described.

Figure 11:
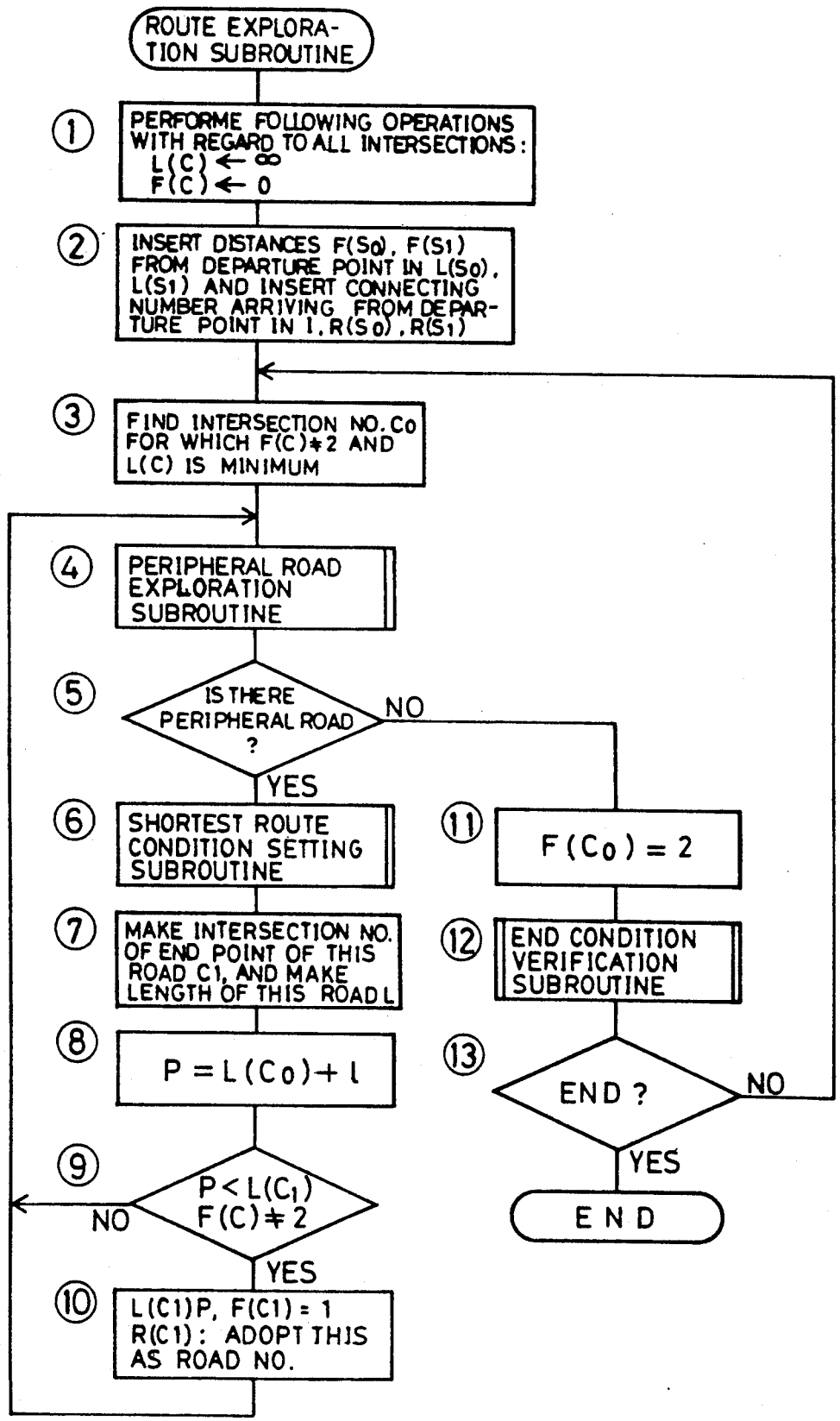
FIG. 11 is a view illustrating an example of route exploration subroutine.

In FIG. 11, L(c) represents distance, F(c) a flag, R(c) the number of an intersection through which the vehicle has passed, $s_0$, $s_1$ the numbers of intersections adjacent a departure point on both sides thereof, and $e_0$, $e_1$ the numbers of intersections adjacent a destination on both sides thereof Further, c denotes an intersection number. The flag F(c) indicates that exploration has not been performed when its value is "0", that exploration is in effect when its value is "1", and that exploration has ended when its value is "2".

① The following is set with regard to all intersections:
Infinity ($\infty$) for distance L(c)
"0" (unexplored) for flag F(c) As a result of these initial settings, all intersections are rendered unexplored and the distance from the point of departure is made infinite.

② Distance from the point of departure is inserted in the distances $L(s_0)$, $L(s_1)$ corresponding to the intersection numbers $s_0$, $s_1$ adjacent the departure point on both sides, "1" is set for the flags $F(s_0)$, $F(s_1)$ corresponding to the intersection numbers $s_0$, $s_1$ adjacent the destination on both sides, and the number of the road from the point of departure is set for the () road number R(c) along which the vehicle has passed.

(3) Intersection number $c_o$, for which flag F is not "2" and the distance L(c) is minimum, is retrieved.

(4) A peripheral road retrieval subroutine is executed to retrieve a peripheral road having the intersection number $c_o$ at its starting point.

(5) It is determined whether a peripheral road exists.

If the answer is YES, the program proceeds to the following processing of step (6); if the answer is NO, the program proceeds to the processing of step 11.

(6) An optimum route condition setting subroutine is executed to set road conditions for retrieving the optimum route as well as other conditions.

(7) The intersection number of the end point of this road is made $c_l$, and the length of this road is made l.

(8) Distance P to the intersection at the end point of this road is computed.

The computation $P = L(c_o) + l$ is performed. Here, $L(c_o)$ is the distance from the departure point to the intersection number $c_o$, and P is the distance from the intersection number $c_o$ to the end-point intersection $c_l$ along this road (the road in the process of being explored).

(9) It is determined whether $P < L(c_l)$ and $F(c_l) \neq 2$ hold.

If the answer is YES, the program proceeds to the following processing of step 10; if the answer is NO, the program proceeds to the processing of step (4).

10 The total distance $L(c_l)$ from the point of departure to the intersection number $c_l$ under exploration is made P, the flag $F(c_l)$ of this intersection number $c_l$ is made "1", and the number $R(c_l)$ of the road traversed to arrive at the intersection number $c_l$ is made the number of the road under exploration.

11 If the answer is NO in the processing of step (5), $F(c_o)$ is set to "2".

(12) An end-condition verification subroutine is executed.

(13) It is determined whether processing has ended. If the answer is NO, the program returns to the processing of step (3); if the answer is YES, then processing is terminated.

By virtue of the foregoing processing, a road number of an optimum course from the point of departure to the pertinent intersection number is set for each and every intersection number in correspondence with respective ones of the intersection numbers.

Figure 12:
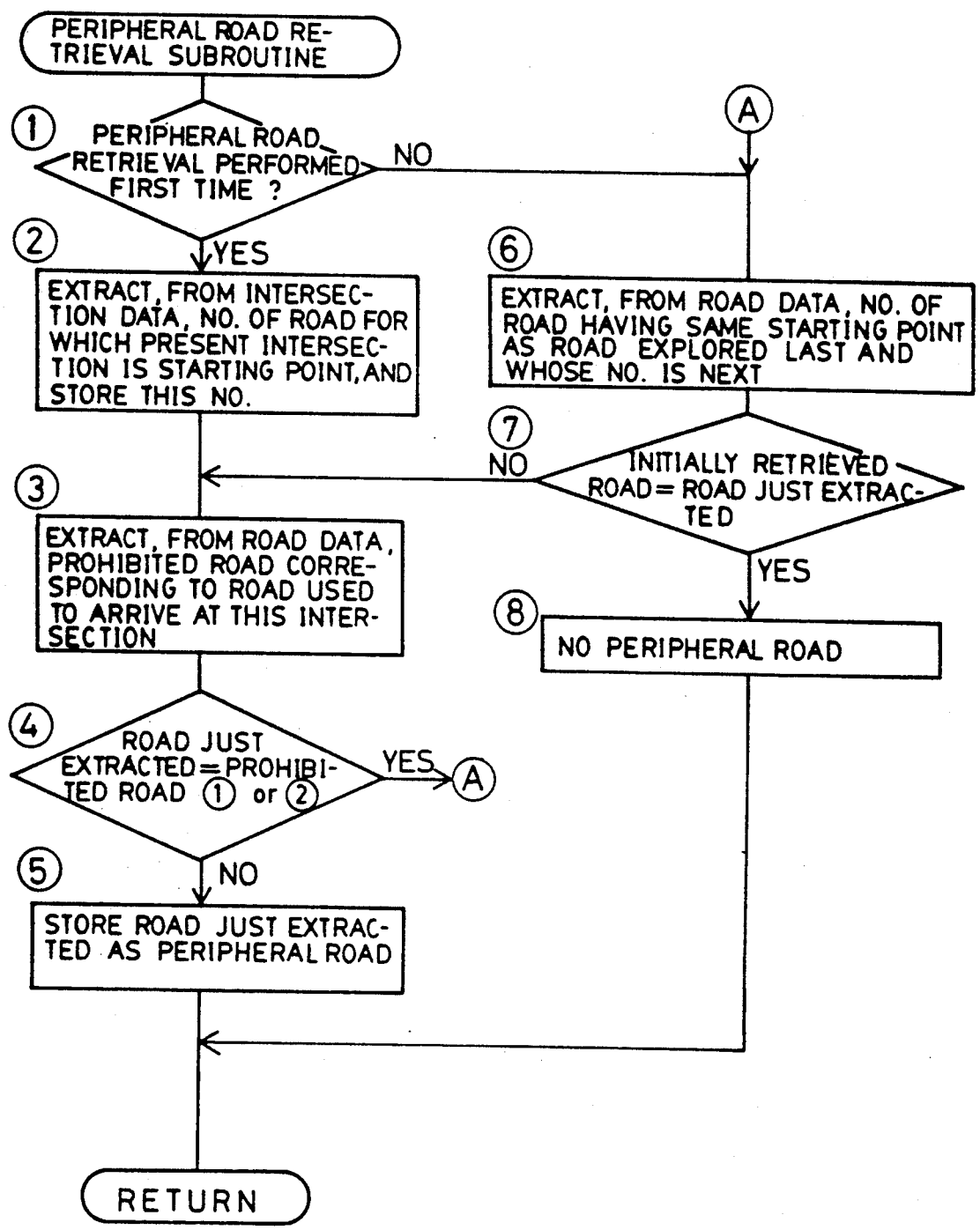
FIG. 12 is a view for describing the flow of processing of peripheral road retrieval subroutine.

The peripheral road retrieval subroutine of processing step (4) is for executing the processing shown in FIG. 12. Specifically, the processing is as follows:

(1) It is determined whether this is the first retrieval of a peripheral road.

If the answer is YES, the program proceeds to the processing of step (2); if the answer is NO, the program proceeds to the processing of step (6).

(2) The road number for which the intersection $c_o$ at which the vehicle is presently located is the starting point is extracted from the intersection data and stored.

(3) Prohibited roads at road numbers leading to the intersection $c_o$ undergoing exploration are extracted by referring to the road data.

(4) It is determined whether a road number just extracted is a prohibited road.

If the answer is YES, the program proceeds to the processing of step (6); if the answer is NO, the program proceeds to the processing of step (5).

(5) The road just extracted is stored as a peripheral road and the program returns [proceeds to the processing step (5) of FIG. 11].

(6) The number of a road having the same starting point as the road retrieved last and whose number is next is extracted from the road data.

(7) It is determined whether the road retrieved initially and the road retrieved now are identical.

If the answer is YES, the program proceeds to the processing of step (8); if the answer is NO, the program proceeds to the processing of step (3).

(8) It is decided that there are no peripheral roads and the program returns.

Figure 13:
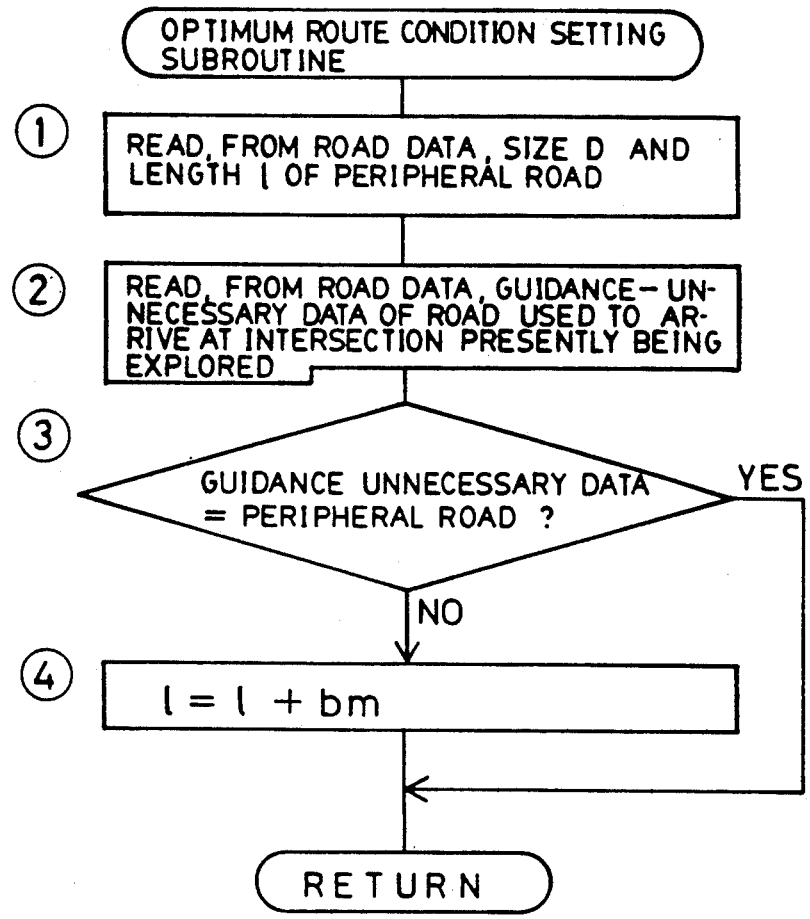
FIG. 13 is a view for describing the flow of processing of a subroutine for setting optimum route conditions.

The optimum route condition setting subroutine of processing step (6) shown in FIG. 11 is for executing the processing shown in FIG. 13. Specifically, the processing is as follows:

(1) Relative length l is read in from the road data.

(2) Guidance-unnecessary data for a road traversed to arrive at the intersection undergoing exploration are read in from the road data.

(3) It is determined whether there is a peripheral road that coincides with the guidance-unnecessary data.

If the answer is YES, the program returns; if the answer is NO, the program proceeds to the next processing step (4).

Figure 14:
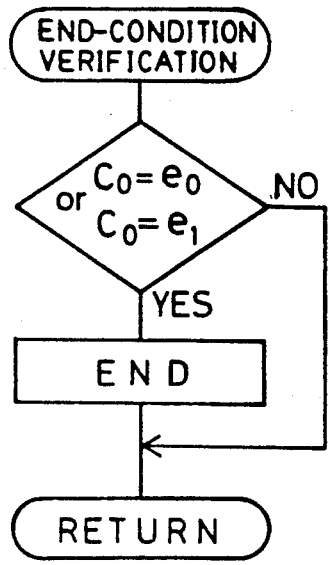
FIG. 14 is a view for describing the flow of processing of a subroutine for verifying end conditions.

(4) A value obtained by adding bm to the length l is adopted as the new length l, and the program returns. That is, with respect to an intersection not requiring guidance, an intersection requiring left-right turn guidance is converted into distance and evaluation is performed by adding bm. With the end-condition verifying subroutine, it is determined whether there is coincidence between an intersection number $c_o$ which is the object of exploration and the intersection numbers adjacent the destination on both its sides, and an end flag is set on the condition that coincidence is established, as shown in FIG. 14. An example of another configuration of road data and the like used in the route exploration method of the invention will now be described with reference to FIG. 15.

Figures 15A, 15D:
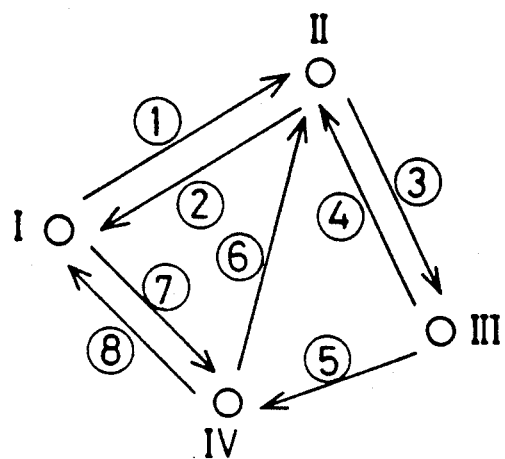

The intersection data will have the data configuration shown in (b) of FIG. 5, the road data will have the data configuration shown in (c), and the node data will have the data configuration shown in (d) in a case where a road network comprises, e.g., intersection numbers I–IV and road numbers (1)–(8) as shown in FIG. 15(a).

Specifically, as shown in (b) of FIG. 15, the intersection data comprises intersection names corresponding to the intersections numbers I–IV, road numbers having the smallest numbers among those roads possessing a certain intersection as a starting point, road numbers having the smallest numbers among those roads possessing a certain intersection as an end point, and information indicating whether or not a certain intersection has a traffic signal.

As shown in (c) of FIG. 15, the road data comprises starting and end points, in the form of intersection numbers, of the road numbers (1) through (8), the numbers of roads having the same starting point, the numbers of roads having the same end point, road width, information relating to prohibitions, information relating to guidance not required, photograph numbers, the numbers of nodes, the leading addresses of node series data, length, etc.

As shown in (d) of FIG. 15, the node array data comprises information relating to east longitude, north latitude, attributes and the like. The units of the road numbers comprise a plurality of nodes, as is evident from the road data. More specifically, the node data is data relating to one point on a road. If a line connecting nodes is referred to as an arc, a road is expressed by connecting each of a plurality of node arrays by arcs. For example, with regard to road number ①, the road comprises 15 nodes and the leading address of the node array data is 100, based on the road data. Therefore, road number ① is composed of node data having addresses 100 to 114.

Assume a case where the intersection is intersection number I, for example. For a course having this intersection as a starting point, in accordance with these network data, first road number ① is retrieved from the starting point information of the intersection point data, then road number ⑦ is retrieved from the road data relating to the road number ①, namely from the column reading "NO: OF ROAD HAVING SAME STARTING POINT". Since the same C information for road number ⑦ will, in converse fashion, lead to retrieval of road number ①, it can be determined that there are no other road numbers available as peripheral roads. The same will hold true with regard to end points. Further, since road number ⑥ will be prohibited in case of road number ⑤ in the road data, the vehicle will not be able to enter road number ⑥ from road number ⑤ at the intersection number IV shown in FIG. 15(a) because turns are prohibited at this intersection. The only L road that can be entered is the road number ⑧. Accordingly, guidance to road number ⑧ is unnecessary. Thus, since the road data in particular possesses the numbers of roads which are forbidden to enter, such as left-right turn prohibitions, as well as the numbers of roads for which guidance is not required, information storage capacity can be reduced and path exploration can be carried out with ease.

An example of a system in which the route exploration method of the invention is applied will be described with reference to FIG. 16.

Figure 16:
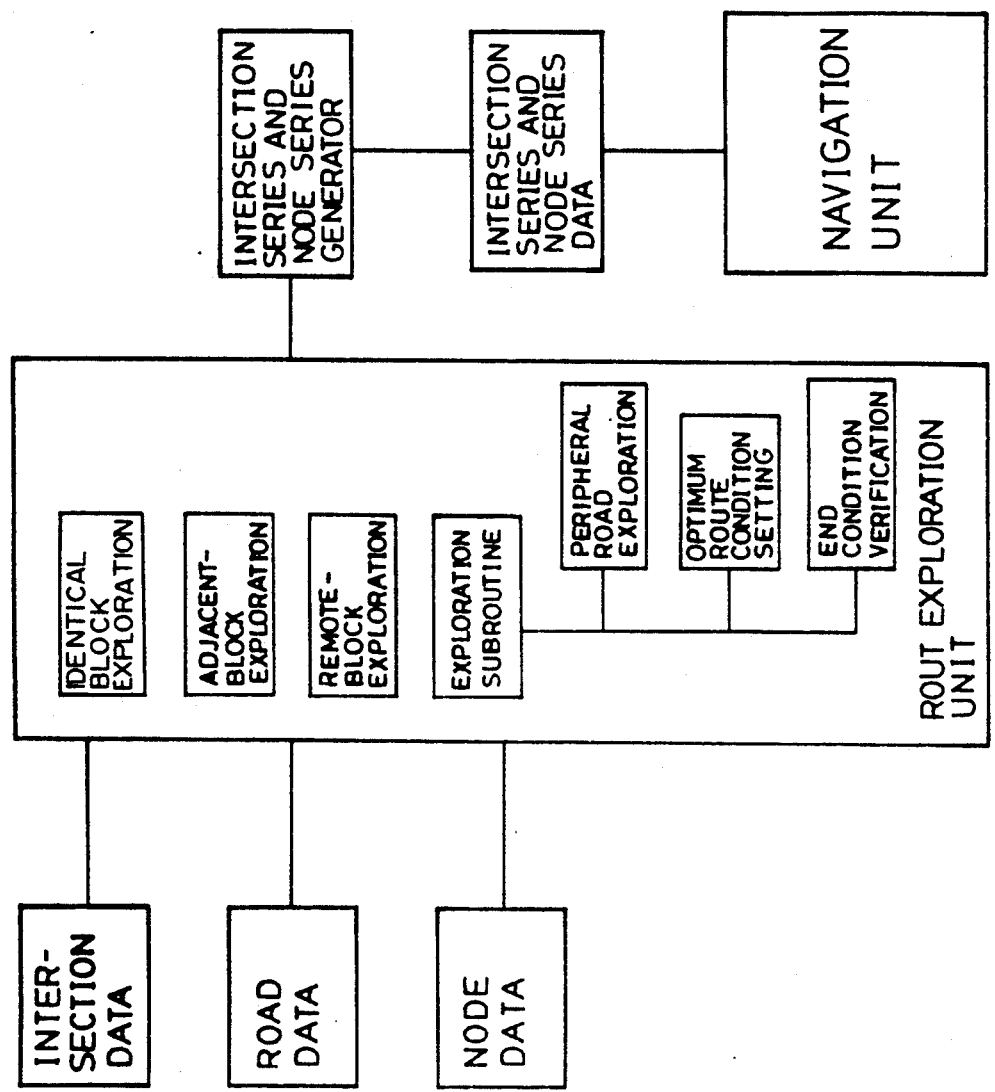
FIG. 16 is a view showing the system configuration of an embodiment applied to the route exploration method of a navigation apparatus according to the invention.

In FIG. 16, numeral 1 denotes intersection data, 2 road data, 3 node data, 4 a route exploration processor, 5 an intersection series and node series generator, 6 intersection series and node series data, and 7 a navigation unit. The route exploration processor 4 executes the processing shown in FIG. 7. This processing includes an identical-block exploration processing routine, an adjacent-block exploration processing routine, a remote-block exploration processing routine and an exploration subroutine, which were described earlier.

Included under the exploration subroutine are a peripheral-road retrieval subroutine for retrieving peripheral roads from an intersection with the exception of roads into which entry is forbidden, such as roads where left-right turns are prohibited, an optimum route condition setting subroutine for setting conditions necessary to compute an optimum route, such as road width and whether or not guidance is required, and an end-condition setting routine for judging the end of route exploration. These subroutines are for retrieving the optimum road from a designated point of departure to a destination. When an optimum route is explored by the route exploration processor 4, the intersection series and node series generator 5 generates intersection series data and node series data, of the kind shown in FIG. 17, along the route, and the navigation unit 7 performs navigation based on these intersection series and node series data. The navigation unit 7 has data processing means and display or voice output means and is adapted to read out the intersection series data and node series data 7 at a predetermined geographical point along a course and provide course guidance by a display output or voice output.

Figure 18:
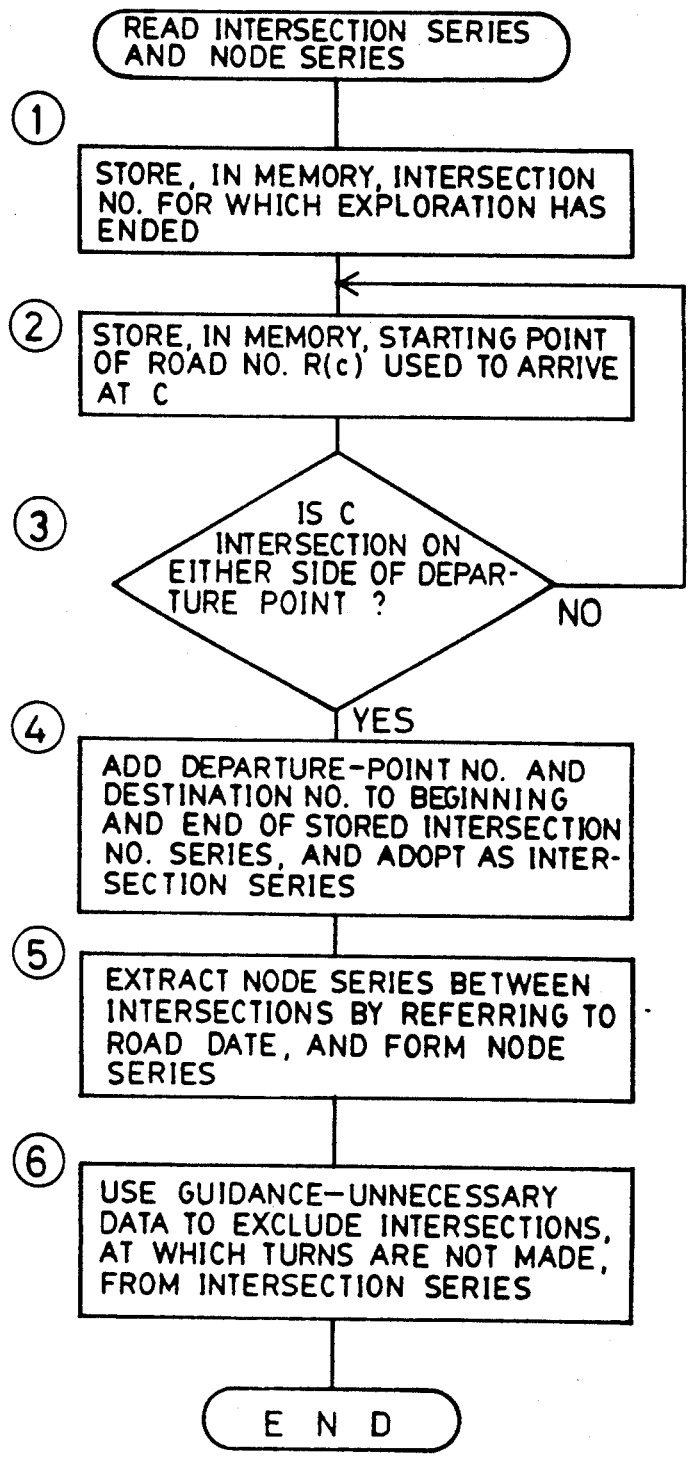
FIG. 18 is a view for describing the flow of processing for reading an intersection series and node series.

In route exploration according to the invention as described above, the optimum route is retrieved by applying weighting to the distance between intersections upon taking into consideration such travelling conditions as the size of peripheral roads and whether or not a road requires guidance. As a result, course number information along the optimum course is obtained in correspondence with each intersection. Thus, in accordance with the results of exploration, intersection series and node series data can be generated in accordance with the processing flow shown in FIG. 18.

① An intersection number for which exploration has ended is stored in memory.

② The starting point of a road number used to arrive at this intersection is stored in memory.

③ It is determined whether this intersection is an intersection adjacent to the destination on either side thereof.

If the answer is YES, the program proceeds to the processing of step ④; if the answer is NO, the program returns to the processing of step ②.

④ A departure-point number and destination number are added to the beginning and end of the stored intersection number series and the result is adopted as an intersection number series.

⑤ A node series between intersections is extracted by referring to the road data and a node series is formed.

⑥ Use is made of the guidance-unnecessary data to exclude guidance-unnecessary intersections from the intersection series.

FIG. 17 illustrates an example of the intersection series and node series data thus generated from the results of route exploration. For example, as shown in FIG. 17(a), the intersection series data comprises such information as intersection name, intersection number, the number of a photograph showing the characteristic scenery of an intersection, the angle of a turn and distance As shown in FIG. 17(b), the node series data comprises such information as east longitude and north latitude representing node position, the intersection number, attribute, angle and distance. Moreover, these data comprise data indicative solely of intersections requiring guidance; in other words, intersections not requiring guidance are excluded. In navigation, therefore, it will suffice to successively read out and output data in correspondence with a predetermined position.

In accordance with route exploration of the invention as described above, exploration is performed while checking left-right turn prohibition data, and a course is retrieved that does not include left-right turn prohibitions. In addition, the shortest route is retrieved by applying weighting to the distance between intersections based on route conversion information, such as the degree of difficulty in traversing a route, upon taking into consideration such travelling conditions as the size of peripheral roads and whether or not a road requires guidance.

The present invention is not limited to the foregoing embodiment but can be modified in various ways. For example, in the foregoing embodiment, exploration is performed while rising to a higher-order layer until point of depature and destination fall in the same block or mutually adjacent blocks. However, it is possible to adopt an arrangement in which, even in case of mutually adjacent blocks, exploration is performed, the system rises to a higher-order layer and the departure point and destination are eventually connected by exploration within the same block. When such an arrangement is adopted, even if there is a more suitable route than the principal road route in the higher-order layer, this route can no longer be set. Accordingly, in the case of mutually adjacent blocks, it is more efficient to terminate route exploration in this layer.

For example, though route exploration was started from a point of departure, it can be arranged for course exploration to start from a destination. Further, though processing was terminated when the destination was reached upon starting route exploration from the point of departure, it can be arranged to perform course exploration until all flags F(c) become 2, namely with regard to all intersections. In particular, when this course exploration is performed from the destination, optimum course information from all intersections to the destination is created. Therefore, even in a case where the system strays off course in mid stream, intersection series and node series data can be created from the nearest intersection.

Thus, in accordance with the present invention as is apparent from the foregoing description, road network data such as intersection data and road data are possessed in the form of a heirarchical structure, and exploration is performed by successively rising from lower-order to higher-order layers. This makes it possible to perform processing while limiting the range of exploration and to raise the speed of exploration processing. In addition, block division is carried out in dependence upon the amount of data in each layer and exploration is executed in block units. As a result, the working area needed for exploration can be reduced and storage area can be conserved.

Intersection data, road data and node series data are stored in memory means such as a CD-ROM in advance, these data are read out to a RAM or the like before route exploration, and route exploration is performed while checking for right-left turn prohibitions. Since the right-left turn prohibition data are possessed in a form contained in the road data, the amount of data can be reduced and so can be required storage capacity. Furthermore, since guidance-unnecessary data are provided and whether to travel straight ahead or turn left or right is decided based on these data, exploration for the shortest route in terms of time can be executed with a small amount of data. Moreover, intersections at which the vehicle travels straight ahead are verified from the guidance-unnecessary data and excluded from the intersection series, and use is made of data indicative solely of intersections at which a left or right turn is made. This is carried out through simple processing.

What is claimed is:

1. A route exploration method in a navigation apparatus for setting a route from a designated departure point to a destination and providing guidance along the route, which comprises:

(a) providing intersection data and roud data in blocks arranged in a higher order and lower order layered format;
(b) designating a departure point and a destination point;
(c) checking positional relationship of blocks containing said departure point and said destination by deciding if the departure point block is remote from the destination block;
(d) setting the departure point and destination in lower layer blocks, in which a road network has a high density, when the departure point block is not remote from the desitnation block;
(e) inputting intersection and road datas of the departure point block;
(f) detecting first connecting intersection of upper layer first blocks, in which a road network has a low density in the departure block, when the eparture point block is remote from the destination block;
(g) setting the departure point and setting the connecting intersection as the destination in the departure block, and as the departure point in the upper layer first blocks;
(h) exploring from the departure point to the desitnation in the departure block;
(i) inputting intersection and road datas of the destination block;
(j) detecting second connecting intersection of the upper layer second blocks in the destination block;
(k) setting the second connecting intersection as the destination in the upper layer second blocks; and
(l) repeating from (a) to (k) until a departure-point block and a destination block become the same or mutually adjacent blocks.

2. A route exploration method in a navigation apparatus according to claim 1, which comprises:

(a') inputting intersection and road datas of the departure point block when the departure point and the destination are in mutually adjacent blocks;
(b') detecting third connecting intersection connecting the departure point block to the destination block;
(c') setting the departure point and setting the connecting intersection as the destination;
(d') exploring from the departure point to the destination in the departure block;
(e') inputting intersection and road datas of the destination block;
(f') setting the destination as the departure point;
(g') exploring from the departure point to the destination in the destination block.

3. A route exploration method in a navigation apparatus according to claim 1, which comprises:

(a'') inputting intersection and road datas of the departure point block when the departure point and the destination are in the same block;
(b'') setting the departure point and the destination;
(c'') exploring from the departure to the destination.

4. A route exploration method in a navigation apparatus according to claim 1, characterized by said road data having left-right turn prohibition information.

* * * * *

UNITED STATES PATENT AND TRADEMARK OFFICE
CERTIFICATE OF CORRECTION

PATENT NO. : 5,168,452
DATED : December 1, 1992
INVENTOR(S) : YAMADA et al.

It is certified that error appears in the above-identified patent and that said Letters Patent is hereby corrected as shown below:

Col. 1, line 20, after "apparatus" insert a period --.--; and line 35, after "apparatus." begin a new paragraph.

Col. 3, line 28, delete "2(b" and insert --2(b)--;

line 30, delete "2(b)" and insert --3(b)--;

line 31, delete "of," insert --of--; and line 43, after "block" delete the period ".".

Col. 4, line 5, delete "III," and insert --III,...--.

Col. 5, line 41, after "etc." begin a new paragraph.

Col. 6, line 55, delete "O".

Col. 7, line 3, delete "16-17" and insert -- ⑯ - ⑰ --;

line 18, delete "18" and insert -- ⑱ --;

UNITED STATES PATENT AND TRADEMARK OFFICE
CERTIFICATE OF CORRECTION

PATENT NO. : 5,168,452
DATED : December 1, 1992
INVENTOR(S) : YAMADA et al.

It is certified that error appears in the above-identified patent and that said Letters Patent is hereby corrected as shown below:

line 20, delete "19-20" and insert -- ⑲ - ⑳ --;

line 23, delete "21" and insert -- ㉑ --;

line 31, delete "higherorder" and insert --higher-order--;

line 50, delete "10" and insert -- ⑩ --;

line 52, delete "11" and insert -- ⑪ --;

line 52, delete "higherorder" and insert --higher-order--;

line 60, delete "12-15" insert -- ⑫ - ⑮ --;

line 63, delete "16" and insert -- ⑯ --.

Col. 8, line 6, delete "17-18" insert -- ⑰ - ⑱ --;

line 8, delete "19" and insert -- ⑲ --;

line 12, delete "20" and insert -- ⑳ --;

line 14, delete "21" and insert -- ㉑ --;

UNITED STATES PATENT AND TRADEMARK OFFICE
CERTIFICATE OF CORRECTION

PATENT NO. : 5,168,452

DATED : December 1, 1992

INVENTOR(S) : YAMADA et al.

It is certified that error appears in the above-identified patent and that said Letters Patent is hereby corrected as shown below:

line 17, delete "22" and insert -- ㉒ --;

line 34, delete "23" and insert -- ㉓ --;

line 36, delete "24-25" insert -- ㉔ - ㉕ --;

line 39, delete "26-27" insert -- ㉖ - ㉗ --;

line 42, dlete "28" insert -- ㉘ --;

line 52, after "thereof" insert a period --.--;

Col. 9, line 1, delete "()";

line 11, delete "11" insert -- ⑪ --;

line 28, delete "10" insert -- ⑩ --;

line 30, delete "10" insert -- ⑩ --;

line 36, delete "11" insert -- ⑪ --;

UNITED STATES PATENT AND TRADEMARK OFFICE
CERTIFICATE OF CORRECTION

PATENT NO.   : 5,168,452
DATED        : December 1, 1992
INVENTOR(S)  : YAMADA et al.

It is certified that error appears in the above-identified patent and that said Letters Patent is hereby corrected as shown below:

```
Col. 10, line 32, after "bm." begin a new paragraph; and
         line 38, after "14." begin a new paragraph.

Col. 11, line 18, delete "NO:" insert --NO.--.

Col. 12, line 43, after "tance" insert a period --.--.

Col. 14, line 1, delete "roud" insert --road--;
         line 18, delete "epar-" insert --depar- --;
         line 25, delete "desitna-" insert --destina- --.
```

Signed and Sealed this

Eleventh Day of January, 1994

Attest:

BRUCE LEHMAN

*Attesting Officer*       *Commissioner of Patents and Trademarks*